United States Patent
Yajima

(10) Patent No.: US 6,733,250 B2
(45) Date of Patent: May 11, 2004

(54) FILTER UNIT, CHEMICAL LIQUID SUPPLY SYSTEM, AND CHEMICAL LIQUID SUPPLY METHOD

(75) Inventor: Takeo Yajima, Tokyo (JP)

(73) Assignee: Koganei Corporation, Tokyo (JP)

( * ) Notice: Subject to any disclaimer, the term of this patent is extended or adjusted under 35 U.S.C. 154(b) by 283 days.

(21) Appl. No.: 09/961,073

(22) Filed: Sep. 21, 2001

(65) Prior Publication Data

US 2002/0131875 A1 Sep. 19, 2002

(30) Foreign Application Priority Data

Mar. 15, 2001 (JP) .................................... 2001-073484

(51) Int. Cl.[7] .............................................. F04B 23/00
(52) U.S. Cl. ........................................ 417/313; 417/53
(58) Field of Search ................................ 417/313, 213, 417/270, 222.1, 222.2, 307; 95/46, 258, 241, 243, 254

(56) References Cited

U.S. PATENT DOCUMENTS

| | | | |
|---|---|---|---|
| 5,762,789 A | * | 6/1998 | de los Reyes et al. .. 210/321.75 |
| 5,792,237 A | | 8/1998 | Hung et al. |
| 5,900,045 A | | 5/1999 | Wang et al. |
| 6,048,454 A | | 4/2000 | Jenkins |
| 6,171,367 B1 | * | 1/2001 | Peng et al. ..................... 95/46 |
| 6,238,576 B1 | | 5/2001 | Yajima |
| 6,378,907 B1 | * | 4/2002 | Campbell et al. ............. 285/26 |
| 6,539,986 B2 | * | 4/2003 | Yajima ........................... 141/2 |
| 6,554,579 B2 | * | 4/2003 | Martin et al. ................. 417/53 |

FOREIGN PATENT DOCUMENTS

| | | | |
|---|---|---|---|
| EP | 0 815 928 A2 | 1/1998 | |
| JP | 10-061558 A | 3/1998 | ......... F04B/43/10 |
| JP | 11-230048 A | 8/1999 | ......... F04B/43/08 |
| JP | 2000120530 | 4/2000 | |

* cited by examiner

*Primary Examiner*—Edward K. Look
*Assistant Examiner*—Vinod D. Patel
(74) *Attorney, Agent, or Firm*—McCormick, Paulding & Huber LLP

(57) ABSTRACT

A filter unit in which a solution storage chamber for storing a chemical liquid supplied from a solution tank and a filter material housing chamber for filtering the chemical liquid in the solution storage chamber by a filter to supply the chemical liquid to a pump are integrally formed is integrally arranged together with the pump. An exhaust path for exhausting air in a solution guide path for causing the solution storage chamber to communicate with the solution tank and the solution storage chamber, and a pump inlet-side path for causing the filter material housing chamber to communicate with the pump are arranged.

31 Claims, 8 Drawing Sheets

FILTER UNIT, CHEMICAL LIQUID SUPPLY SYSTEM, AND CHEMICAL LIQUID SUPPLY METHOD

TECHNICAL FIELD OF THE INVENTION

The present invention relates to a filter unit and a chemical liquid supply system and a chemical liquid supply method which are designed to predetermined amounts of a chemical liquid such as a photoresist solution.

BACKGROUND OF THE INVENTION

Chemical liquid such as a photoresist solution, a spinion glass solution, a polyimide resin solution, pure water, an etching solution, and an organic solution are used in manufacturing processes in various technical fields including a semiconductor wafer manufacturing technique, a liquid crystal substrate manufacturing technique, a magnetic disk manufacturing technique, and a multi-layered wiring board manufacturing technique. A chemical liquid supply system is used for coating with these chemicals.

For example, when a photoresist solution is to be coated on a surface of a semiconductor wafer, a predetermined amount of photoresist solution is dropped on the surface of the semiconductor wafer while the semiconductor wafer is rotated in a horizontal plane. In such a chemical liquid supply system, in order to deliver a chemical liquid such as a photoresist solution, a pump having a pump member formed of an elastically transformable tube or bellows as shown in Japanese Patent Laid-Open Publication No. 11-230048 or Japanese Patent Laid-Open Publication No. 10-61558 is used.

When a photoresist solution coated on a surface of a semiconductor wafer contains air bubbles or contaminants, a manufacturing yield of semiconductor integrated circuit devices decreases. For this reason, in a chemical liquid supply system used for a coating operation with such a photoresist solution, a filter is set to remove air bubbles and contaminants in the photoresist solution.

The filter is arranged on the primary side or secondary side of a pump, the degree of purity of a chemical liquid such as a photoresist solution is increased such that the chemical liquid passes through the filter by the delivery pressure of the pump. For this reason, contaminants are gradually adhered to the surface of the filter to cause clogging, and filters must be periodically exchanged. In this case, in recent years, filters are generally exchanged together with housings covering the filters.

In order to improve productivity, it is desired that a photoresist solution is continuously coated on a semiconductor wafer. For this reason, the coating operation must be designed to be performed when a photoresist solution stored in a solution tank is exhausted to exchange the solution tank for a new solution tank. Therefore, a buffer tank is arranged between a solution tank and the pump.

A chemical liquid flowed from the solution tank is filled in the buffer tank, and the pump is drawn through a pump inlet path connected to the bottom of the buffer tank. Therefore, when the solution tank is exchanged, or the solution tank is empty, the pump draws the chemical liquid in the buffer tank. For this reason, air bubbles cannot be prevented from being drawn into the pump. After completion of the exchange of solution tanks, the surface of the solution in the solution tank is pressured to fill the buffer bank with the chemical liquid so that air bubbles collected in the buffer tank are exhausted from an exhaust path.

In such a chemical liquid supply system, in order to improve the degree of purity of the chemical liquid it is important that a surface with which the chemical liquid is in contact, i.e., the contact surface of the solution is lowered in the flow path in the device. For this purpose, it is important that the configuration of the chemical liquid supply system is simplified.

SUMMARY OF THE INVENTION

However, in the chemical liquid supply system, since the filter is independent of the buffer tank, the flow path for connecting the filter and the buffer tank is required and an exhaust path for extracting air must be arranged in the filter and the buffer tank, respectively. Therefore, it is difficult to simplify the configuration of the chemical liquid supply system.

In addition, since the inner wall of the buffer tank is exposed to the air each time the solution tank is empty, a photoresist solution remaining on and adhered to the inner wall is hardened or gelled to be contaminants, and the contaminants may be mixed with a newly supplied photoresist solution. These contaminants cannot be easily filtered by a filter. Furthermore, since the buffer tank is structured such that the buffer tank cannot be easily exchanged because of the function of the buffer tank, it is difficult to remove the deteriorated photoresist solution generated from the inner surface of the buffer tank. For this reason, the yield of products is decreased.

It is an object of the present invention to coat a chemical liquid having a high degree of purity.

According to the present invention, there is provided a filter unit including a filter vessel in which a filter material housing chamber and a solution storage chamber for storing a chemical liquid are arranged, the filter material housing chamber having a bottom wall portion, a side wall portion, and an upper wall portion and having a filter material incorporated therein, a solution inflow port arranged on the filter vessel to communicate with the solution storage chamber; a solution outflow port, arranged on the filter vessel, for guiding a solution filtered by the filter material, and an exhaust port, arranged on the filter vessel to communicate with the solution storage chamber, for exhausting a gas in the solution storage chamber.

In the filter unit according to the present invention, the filter vessel supports the filter material and has an adaptor for partitioning the filter vessel into a lower filter material housing chamber and an upper solution storage chamber, and the adaptor has a filtered solution guide path for guiding a filtered solution to the solution outflow port.

In the filter unit according to the present invention, the filter vessel has a partition wall for partitioning the filter vessel into the solution storage chamber and the filter material housing chamber, and a communication hole for causing the solution storage chamber and the filter material housing chamber to communicate with each other is formed in a lower end portion of the partition wall.

The filter unit according to the present invention has an exhaust port arranged on the filter vessel to communicate with the filter material housing chamber.

The filter unit according to the present invention has solution level detection means for detecting a solution level of the chemical liquid in the solution storage chamber.

According to the present invention, there is provided a chemical liquid supply system including a pump and a solution inflow port, the pump having a solution delivery port to which a solution delivery path having a delivery nozzle arranged thereon is connected, a filter vessel in which a filter housing chamber having a filter material incorporated therein and a solution storage chamber for storing a chemical liquid are arranged, a solution inflow port to which a solution guide path connected to a solution tank is connected and which is formed on the filter vessel to communicate with the solution storage chamber, a solution outflow port which is formed on the filter vessel and to which a pump inlet path connected to the solution inflow port is connected, and an exhaust port, which is formed on the filter vessel to communicate the solution storage chamber, for exhausting a gas in the solution storage chamber.

In the chemical liquid supply system according to the present invention, the filter vessel is integrated with the pump.

In the chemical liquid supply system according to the present invention, a return path for connecting the pump to the solution storage chamber is arranged, and the chemical liquid and the gas in the pump can be moved to the solution storage chamber.

According to the present invention, there is provided a chemical liquid supply system including a filter vessel in which a filter material housing chamber having a filter material incorporated therein and a solution storage chamber for storing a chemical liquid are arranged, a solution inflow port to which a solution guide path connected to a solution tank is connected and which is formed on the filter vessel to communicate with the solution storage chamber, a solution outflow port which is formed on the filter vessel and to which a solution delivery path provided with the delivery nozzle is connected, an exhaust port, which is formed on the filter vessel to communicate the solution storage chamber, for exhausting a gas in the solution storage chamber, and pressure-sending means for pressure-sending the chemical liquid in the solution storage chamber to the delivery nozzle by pressuring the solution surface of the solution tank.

In the chemical liquid supply system according to the present invention, the filter vessel is detachable.

The chemical liquid supply system according to the present invention further includes solution level detection means for detecting a solution level of the chemical liquid in the solution storage chamber.

The chemical liquid supply system according to the present invention further includes solution detection means for detecting whether or not a solution is present in the solution guide path.

The chemical liquid supply system according to the present invention further includes solution detection means for detecting whether a solution is present in the exhaust path connected to the exhaust port or not.

According to the present invention, there is provided a chemical liquid supply method using a chemical liquid supply system including a pump having a solution delivery port to which a solution delivery path having a delivery nozzle arranged thereon is connected and a solution inflow port, a filter vessel in which a filter housing chamber having a filter material incorporated therein and a solution storage chamber for storing a chemical liquid are arranged, a solution tank connected to the solution storage chamber through a solution guide path, and solution level detection means for detecting a solution level of the chemical liquid in the solution storage chamber, including the empty detection step of detecting that the solution tank is empty when the solution level detection means detects that the solution level of the chemical liquid in the solution storage chamber is not higher than a predetermined value, the filling step of setting the solution tank in an initial state, and the injection step of injecting the chemical liquid in the solution tank into the solution storage chamber such that the solution level is not lower than the predetermined value, wherein the chemical liquid is injected into the solution storage chamber while a chemical liquid delivery/supply operation from the delivery nozzle is performed by operating the pump.

According to the present invention, there is provided a chemical liquid supply method using a chemical liquid supply system including a filter vessel in which a filter material housing chamber having a filter material incorporated therein and a solution storage chamber for storing a chemical liquid are arranged, a solution tank connected to the solution storage chamber through a solution guide path, pressure sending means for pressure-sending the chemical liquid in the solution storage chamber to the delivery nozzle by pressuring the solution surface of the solution tank, and solution level detection means for detecting a solution in the chemical liquid in the solution storage chamber, including the empty detection step of detecting that the chemical liquid in the solution tank is exhausted when the solution detection means detects that the solution is not present in the solution guide path, the filling step of setting the solution tank in an initial state, and the injection step of injecting the chemical liquid in the solution tank into the solution storage chamber such that the solution level of the chemical liquid in the solution storage chamber detected by the solution level detection means is not lower than the predetermined value, wherein the chemical liquid is injected into the solution storage chamber while a chemical liquid delivery/supply operation from the delivery nozzle is performed by the pressure sending means.

According to the present invention, there is provided a chemical liquid supply method using a chemical liquid supply system including a pump having a solution delivery port to which a solution delivery path having a delivery nozzle arranged thereon is connected and a solution inflow port, a filter vessel in which a filter material housing chamber having a filter material incorporated therein and a solution storage chamber for storing a chemical liquid are arranged, a solution tank connected to the solution storage chamber through a solution guide path, solution level detection means for detecting a solution level of the chemical liquid in the solution storage chamber, and solution detection means for detecting the solution in the solution guide path, including the empty detection step of detecting that the chemical liquid in the solution tank is exhausted when the solution detection means detects that the solution is not present in the solution guide path, the filling step of setting the solution tank in an initial state, and the injection step of injecting the chemical liquid in the solution tank into the solution storage chamber such that the solution level of the chemical liquid in the solution storage chamber detected by the solution level detection means is not lower than the predetermined value, wherein the chemical liquid is injected into the solution storage chamber while a chemical liquid delivery/supply operation from the delivery nozzle is performed by operating the pump.

According to the present invention, there is provided a chemical liquid supply method using a chemical liquid supply system including a filter vessel in which a filter material housing chamber having a filter material incorporated therein and a solution storage chamber for storing a chemical liquid are arranged, a solution tank connected to the solution storage chamber through a solution guide path, pressure sending means for pressure-sending the chemical liquid in the solution storage chamber to the delivery nozzle by pressuring the solution surface of the solution tank, and solution detection means for detecting a solution in the solution guide path, including the empty detection step of detecting that the chemical liquid in the solution tank is exhausted when the solution detection means detects that the solution is not present in the solution guide path, the filling step of setting the solution tank in an initial state, and the injection step of injecting the chemical liquid in the solution tank into the solution storage chamber such that the solution level of the chemical liquid in the solution storage chamber detected by the solution level detection means is not lower than the predetermined value, wherein the chemical liquid is injected into the solution storage chamber while a chemical liquid delivery/supply operation from the delivery nozzle is performed by the pressure sending means.

The chemical liquid supply method according to the present invention further includes the exhaust step of exhausting a gas entering into the chemical liquid storage chamber in the injection step from an exhaust path.

The chemical liquid supply method according to the present invention further includes the alarm output step of outputting an alarm when lowest solution level detection means detects that the solution level in the solution storage chamber is the lowest solution level.

In the present invention, the solution storage chamber and the filter material housing chamber are integrally arranged in the filter vessel, so that the number of contact solution surfaces can be decreased by simplifying the configuration of the chemical liquid supply system. For this reason, a chemical liquid having a high degree of purity can be coated.

DESCRIPTION OF THE PREFERRED EMBODIMENTS

Embodiments of the present invention will be described below with reference to the accompanying drawings.

Figure 1:
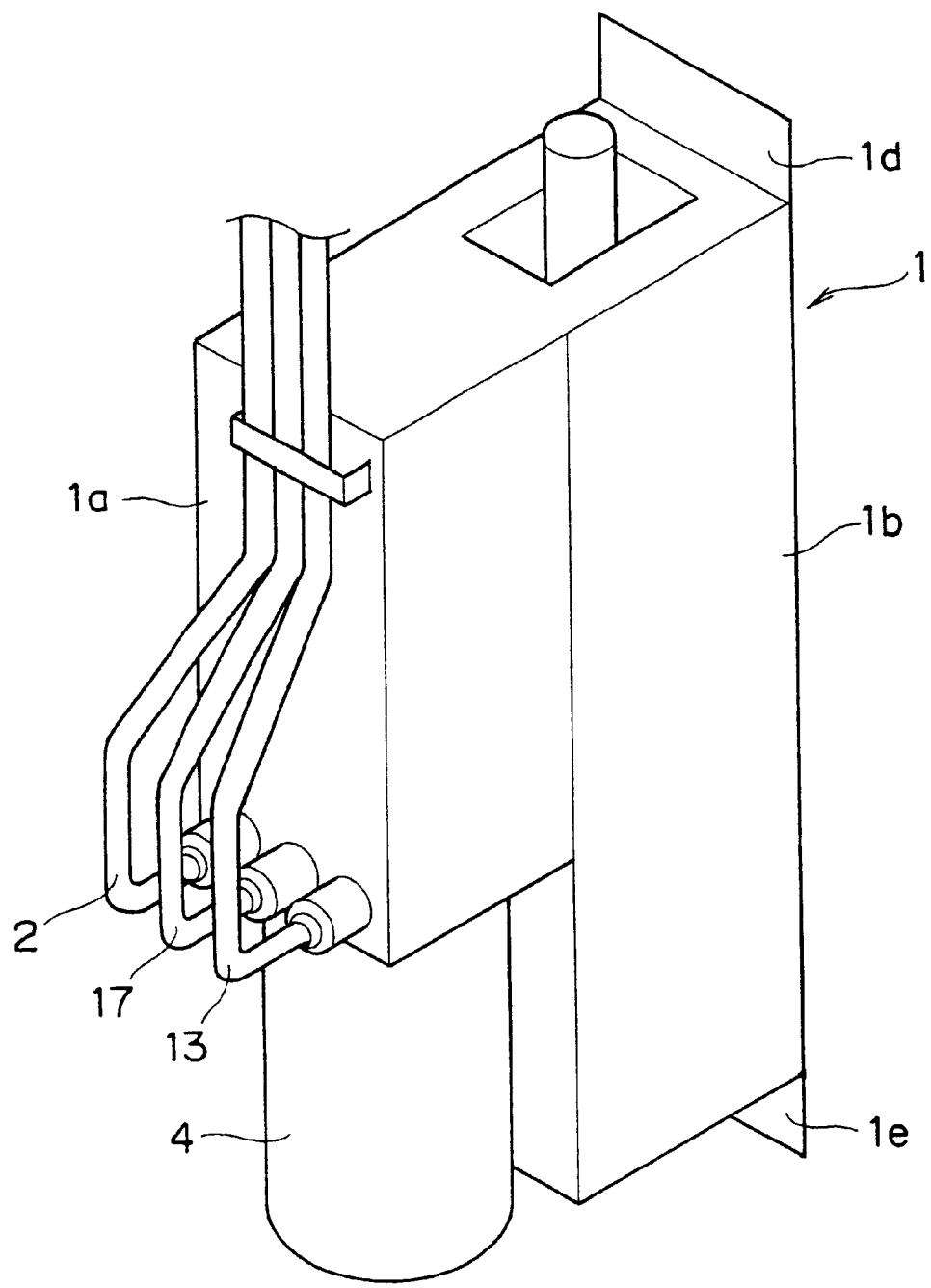
FIG. 1 is a perspective view showing a chemical liquid supply system according to an embodiment of the present invention.
Figure 2:
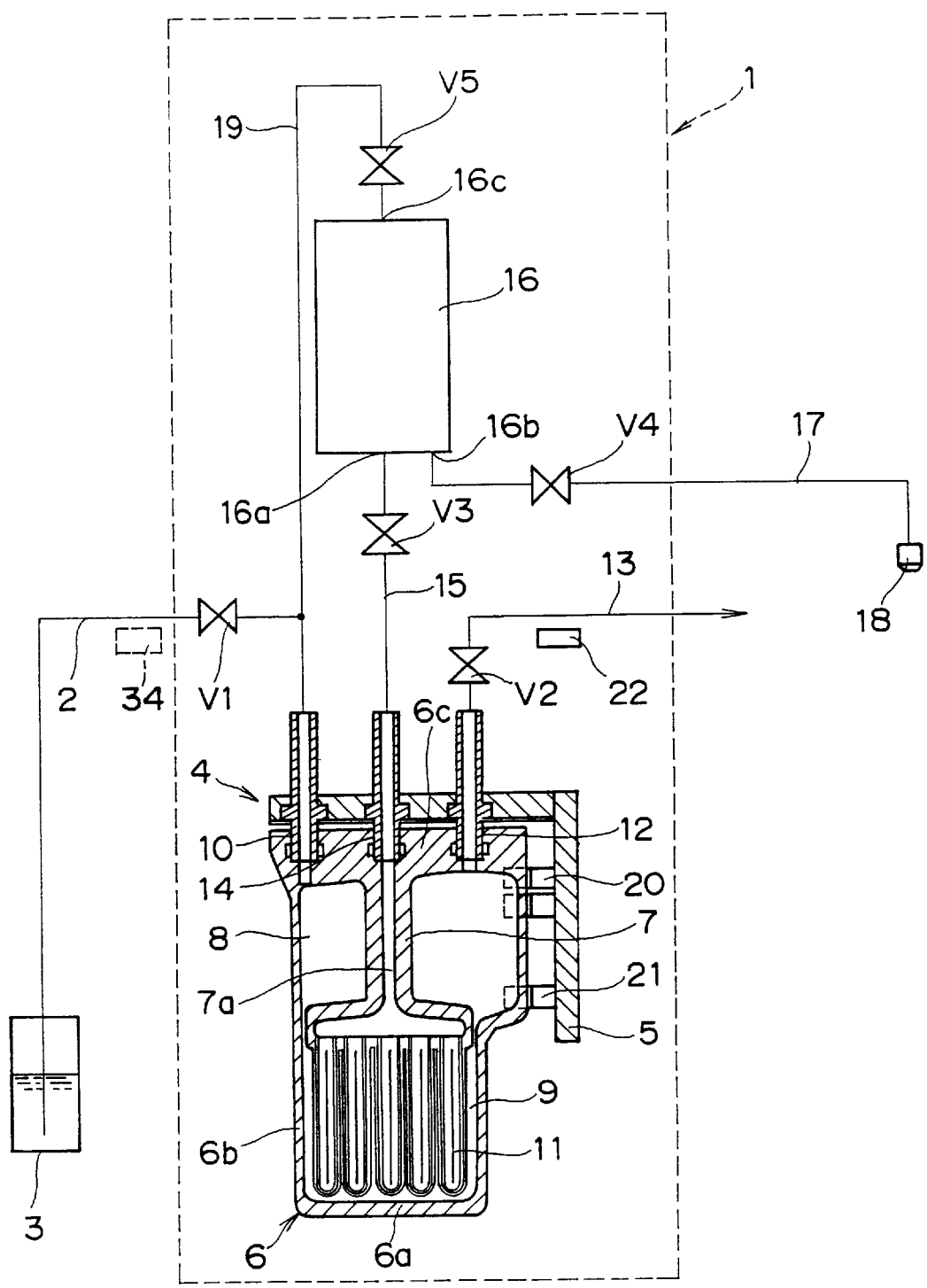
FIG. 2 is a sectional view showing the details of the chemical liquid supply system shown in FIG. 1.
Figure 3:
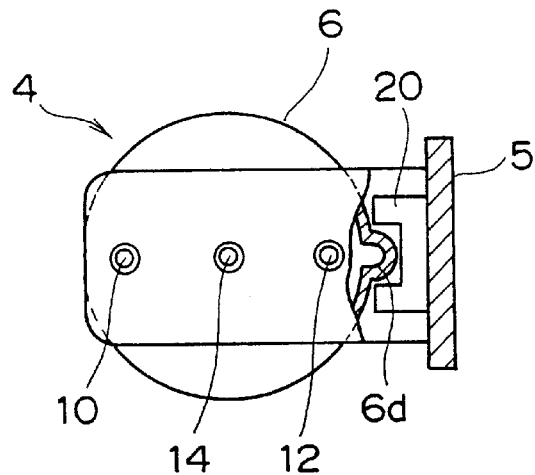
FIG. 3 is a partially cut-away sectional view obtained by viewing the filter unit shown in FIG. 2 from the above.

FIG. 1 is a perspective view showing a chemical liquid supply system according to an embodiment of the present invention, and FIG. 2 is a sectional view showing the details of the chemical liquid supply system shown in FIG. 1. FIG. 3 is a partially cut-away sectional view obtained by viewing the filter unit shown in FIG. 2 from the above.

The chemical liquid supply system shown in FIG. 1 is used to coat a photoresist solution on a semiconductor wafer.

A chemical liquid supply system body 1 of the chemical liquid supply system is formed by a housing unit 1$a$ for housing a pump body portion and a housing unit 1$b$ for housing a pump drive portion. Fixing portions 1$d$ and 1$e$ are arranged on the housing unit 1$b$, so that the chemical liquid supply system body 1 can be fixed to a predetermined position.

A filter unit 4 communicating a solution tank 3 through a solution guide path 2 having an inflow-side opening/closing valve V1 arranged therein is fixed to the housing unit 1$a$. The filter unit 4 is constituted by a blanket 5 having an attaching/detaching mechanism and a filter vessel 6. The filter vessel 6 is detachably set in the chemical liquid supply system body 1 to be integrated with the pump.

The filter vessel 6 is constituted by a side wall portion 6$b$ which is cylindrically formed and an upper wall portion 6$c$, and the adapter 7 is provided in that interior. The interior of the filter vessel 6 is partitioned by the adaptor 7 into a solution storage chamber 8 located at the upper portion of the filter vessel 6 and a filter material housing chamber 9 located at the lower portion.

The solution storage chamber 8 communicates with the solution tank 3 through the solution guide path 2 connected to a solution inflow port 10 arranged on the upper wall portion 6$c$ to store a photoresist solution supplied from the solution tank 3. When the solution is stored in the solution storage chamber 8, another buffer tank need not arranged.

In order to filter the photoresist solution, a filter 11 serving as a filter material supported by the adaptor 7 is incorporated in the filter material housing chamber 9 arranged in the lower portion of the solution storage chamber 8. The filter 11 is formed of hollow-fiber membranes. The photoresist solution passes through the hollow-fiber membranes to correct contaminants and air bubbles contained in the photoresist solution on the surface of the filter 11. Since the solution storage chamber 8 communicates with the filter material housing chamber 9, the filter 11 is always dipped in the photoresist solution when the photoresist solution is filled in the solution storage chamber 8.

In this manner, since the solution storage chamber 8 having a buffer function and the filter material housing chamber 9 having the filter 11 therein are integrally formed in the filter unit 4, the number of contact solution surfaces can be decreased by simplifying the configuration of the chemical liquid supply system, and a chemical liquid having a high degree of purity can be coated. The filter 11 is periodically exchanged. At this time, since the solution storage chamber 8 is exchanged together with the filter 11, contamination caused by the photoresist solution which is adhered to the inner wall of the solution storage chamber 8 and hardened or gelled can be suppressed to a minimum level.

In addition, an exhaust path 13 on which an exhaust opening/closing valve V2 is arranged is connected to an exhaust port 12 arranged on the upper wall portion 6$c$, so that a gas in the solution storage chamber 8 can be exhausted out of the solution storage chamber 8. In the conventional technique, exhaust paths are arranged for a buffer tank and a filter, respectively. However, in the chemical liquid supply system according to the present invention, since the solution storage chamber 8 and the filter material housing chamber 9 are integrally formed, only one exhaust path 13 may be arranged. The number of contact solution surfaces can be decreased by simplifying the configuration of the chemical liquid supply system, and the chemical liquid supply system can be easily maintained.

A filtered solution guide path 7a for causing a solution outflow port 14 arranged on the upper wall portion 6c and the filter material housing chamber 9 to communicate with each other is arranged in the adaptor 7. A pump inlet-side path 15 on which a drawing-side opening closing valve V3 is arranged is connected to the solution outflow port 14. The other end of the pump inlet-side path 15 is connected to a solution inflow port 16a of a pump 16.

A solution delivery path 17 on which a delivery-side opening/closing valve V4 is arranged is connected to a solution delivery port 16b of the pump 16 to guide a solution delivered from the pump 16 to a delivery nozzle 18. In addition, one end of a return path 19 on which a return opening/closing valve V5 is arranged is connected to a solution delivery port 16c of the pump 16, and the other end of the return path 19 is connected to the solution guide path 2.

As shown in FIG. 1, since the solution guide path 2, the exhaust path 13, and the solution delivery path 17 are connected to the chemical liquid supply system body 1 through attaching/detaching mechanisms in the housing unit 1a, these paths can be easily exchanged, and the chemical liquid supply system can be easily maintained.

A sensor 20 fixed to the blanket 5 and serving as a solution level detection means and a sensor 21 fixed to the blanket 5 and serving as a lowest solution level detection means are arranged in the filter unit 4. As shown in FIG. 3, light-emitting portions and light-receiving portions are arranged in these sensors 20 and 21 to surround the convex portion 6d arranged on the side wall portion 6b of the filter unit 4, so that transmission or shield of light axes irradiated from the light-emitting portions is detected by the light-receiving portions to detect the presence/absence of the photoresist solution. The sensor 20 is arranged at a position where the solution surface of the photoresist solution supplied into the solution storage chamber 8 is at the highest level, and the sensor 21 is arranged at a position where the solution surface of the photoresist solution supplied into the solution storage chamber 8 is at the lowest level. Therefore, the highest solution surface and the lowest solution surface of the photoresist solution stored in the solution storage chamber 8 can be detected by the sensors 20 and 21, respectively. In this embodiment, the sensors 20 and 21 are arranged at the positions where the solution surface of the photoresist solution is at the highest level and the lowest level. However, the present invention is not limited to this configuration, the sensors 20 and 21 may be arranged at intermediate positions between the lowest position and the highest position. The sensors 20 and 21 perform detection by using transmission and shield of light. However, the present invention is not limited to this configuration, and a sensor which detects the refractive index of light, a sensor which detects a change in capacitance, or a sensor which detects a change in ultrasonic wave may be used. Furthermore, in the embodiment, although the sensors 20 and 21 are arranged outside the filter unit 4, the sensors 20 and 21 may be arranged in the filter unit 4. In this case, a detection means using a floatage may be used.

A sensor 22 serving as a solution detection means is arranged in the exhaust path 13, so that the sensor 22 can detect that a photoresist solution flows into the exhaust path 13.

Figure 4:
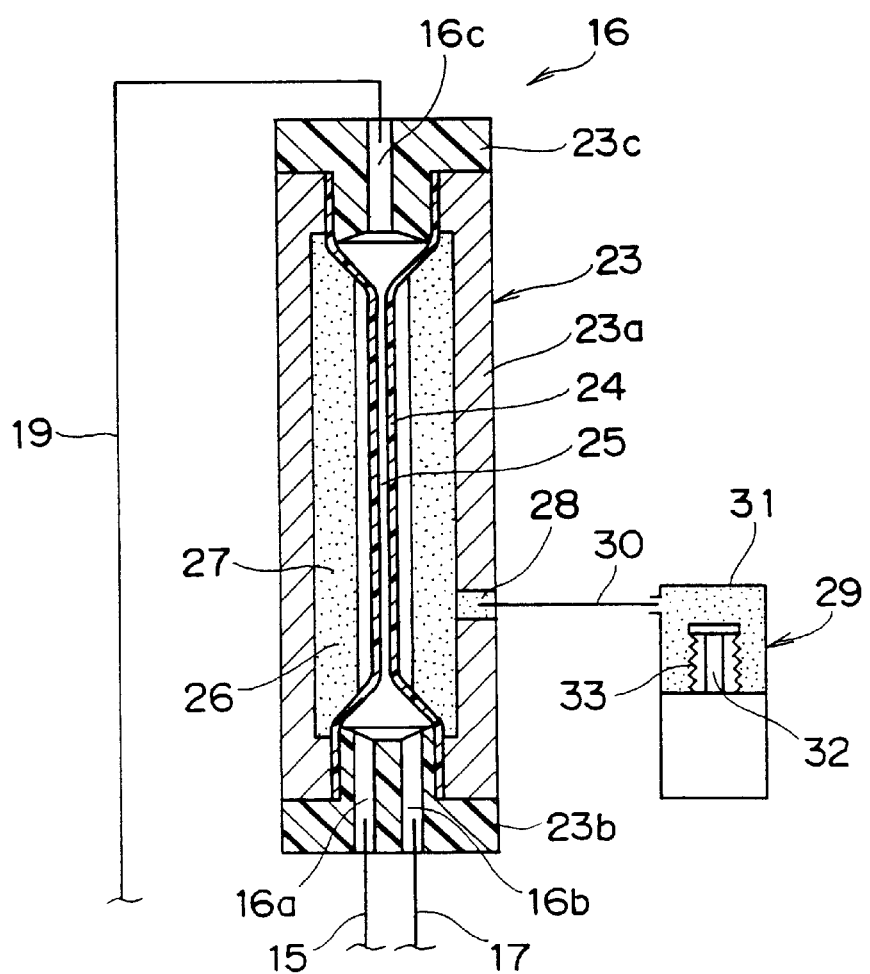
FIG. 4 is a sectional view showing the details of the pump shown in FIG. 2.

FIG. 4 is a sectional view showing the details of the pump shown in FIG. 2. A housing 23 of the pump 16 has a cylindrical body portion 23a having a storage chamber formed therein and joint portions 23b and 23c arranged on both the ends of the cylindrical body portion 23a. The solution inflow port 16a to which the pump inlet-side path 15 is connected and the solution delivery port 16b to which the solution delivery path 17 is connected are arranged in the joint portion 23b, and the solution delivery port 16c to which the return path 19 is connected is arranged in the joint portion 23c. Between the joint portions 23b and 23c, a flexible tube 24 which is made of an elastic material and can freely expand and contract is located in the storage chamber in the cylindrical body portion 23a and fixed in the storage chamber. The interior of the flexible tube 24 serves as a pump chamber 25 which expands and contracts.

A space between the flexible tube 24 and the housing 23 serves as a pressure chamber 26. In this pressure chamber 26, a pressure medium 27 which is a non-compressive fluid or a fluid such as a solution is supplied from a supply port 28 formed in the housing 23. In order to cause the flexible tube 24 to expand and contract by pressure-supplying the pressure medium 27 into the pressure chamber 26 and adsorptively exhausting the pressure medium 27, a bellows pump 29 is connected to the supply port 28 with a flow path 30. A bellows 33 which can freely expand or contract by a drive rod 32 is incorporated in a pump housing 31 of the bellows pump 29. The drive rod 32 is reciprocated by a drive section such as an electric motor or an actuator housed in the housing unit 1a to cause the pump chamber 25 of the flexible tube 24 to expand or contract, and the pump 16 performs a pump operation.

With the pump operation of the pump 16, the opening/closing valves V1 to V5 are opened or closed to open or close the flow paths, so that the chemical liquid supply system can perform chemical liquid delivery/supply operation to coat a photoresist solution. As the opening/closing valves V1 to V5, solenoid valves operated by electric signals, air operation valves operated by air pressures, and the like may be used.

The operation of the chemical liquid supply system will be described below.

The photoresist solution is filled in the solution tank 3 and in the solution storage chamber 8 to set an initial state in which the sensors 20 and 21 detect the photoresist solution. In this state, the inflow-side opening/closing valve V1 and the drawing-side opening/closing valve V3 are opened, and the delivery-side opening/closing valve V4, the return opening/closing valve V5, and the exhaust opening/closing valve V2 are closed to cause the pump 16 to perform a drawing operation. The photoresist solution stored in the solution tank 3 by the drawing operation of the pump 16 is supplied into the solution storage chamber 8 through the solution guide path 2. The photoresist solution is filtered by the filter 11 and then drawn into the pump 16 through the pump inlet-side path 15. Since the solution surface of the photoresist solution filled in the solution storage chamber 8 is higher than the upper surface of the filter 11, the pump 16 does not draw a gas.

Upon completion of the drawing operation, the delivery-side opening/closing valve V4 is opened, and the inflow-side opening/closing valve V1, the drawing-side opening/closing valve V3, the return opening/closing valve V5, and the exhaust opening/closing valve V2 are closed to cause the pump 16 to perform a delivery operation. The photoresist solution drawn into the pump 16 by the delivery operation of the pump 16 is delivered from the delivery nozzle 18 through the solution delivery path 17, and the photoresist solution is coated on the surface of a semiconductor wafer. At this time, the inflow-side opening/closing valve V1 may be opened. The drawing operation and the delivery operation are alternately performed, so that the chemical liquid supply system can perform a chemical liquid delivery/supply operation.

The chemical liquid supply system can perform circular filtering of the chemical liquid to increase the degree of purity of the photoresist solution. The circular filtering can be performed by the following manner. That is, after the photoresist solution is drawn into the pump 16 in a drawing operation, when the inflow-side opening/closing valve V1 and the return opening/closing valve V5 are opened, and when the drawing-side opening closing valve V3, the delivery-side opening/closing valve V4, and the exhaust opening/closing valve V2 are closed, a delivery operation of the pump 16 can be performed. When this operation is performed, a photoresist solution drawn into the pump 16 is returned to the solution guide path 2 through the path 19, and is drawn by the pump 16 through the filter 11 again. For this reason, the degree of purity of the photoresist solution can be increased. The chemical liquid supply system described in this embodiment is designed to be able to circular filtering. However, a circuit which does not have return path 19 and in which the pump 16 is simply connected to the secondary side of the filter unit 4 may be used.

When the chemical liquid delivery/supply operation is performed, the photoresist solution filled in the solution tank 3 is supplied to the solution storage chamber 8. For this reason, when the chemical liquid delivery/supply operation is continuously performed, the solution tank 3 is empty, and the solution surface in the solution storage chamber 8 is lowered. In this state, when the chemical liquid delivery/supply operation is further continuously performed, the filter 11 is exposed from the photoresist solution, and the pump 16 draws a gas. The manufacturing yield of semiconductor integrated circuit devices decreases. Therefore, the photoresist solution must be supplied to the empty solution tank 3.

In the chemical liquid supply system according to the present invention, when the solution tank 3 is empty by continuously performing the chemical liquid delivery/supply operation, the solution surface in the solution storage chamber 8 is lower than a predetermined value, and it is detected by the sensor 20 as an empty detection step that the solution tank 3 is empty.

When it is detected that the solution tank 3 is empty, a filling step of filling a photoresist solution in the solution tank 3, and the solution tank 3 is filled up with a chemical liquid. In this embodiment, the solution tank 3 is filled with the photoresist solution to return the state to the initial state. However, the solution tank 3 may be removed, and the solution tank 3 may be exchanged for a new solution tank 3 filled with a photoresist solution.

When a filling completion signal is input upon completion of filling a photoresist solution, the pump 16 uses idle time of the chemical liquid delivery/supply operation to perform a drawing operation independently of the original chemical liquid delivery/supply operation. The exhaust opening/closing valve V2 and the return opening/closing valve V5 are opened, the other opening/closing valves are closed, and a delivery operation is performed. When the operation is repeated, the photoresist solution is introduced into the solution storage chamber 8, and a gas in the solution storage chamber 8 is exhausted from the exhaust path 13 as an exhaust step. When the solution level of the photoresist solution in the solution storage chamber 8 is a predetermined value or higher, and when the photoresist solution begins to be flowed from the exhaust path 13, it is recognized by the sensor 22 that the state is returned to the initial state, and a normal chemical liquid delivery/supply operation is performed. When such an injection step is performed, the photoresist solution can be injected into the solution storage chamber 8 without stopping the original chemical liquid delivery/supply operation.

As another method different from the injection step, the following method is used. That is, a photoresist solution the amount of which is larger than an expected amount of photoresist solution to be delivered is drawn by the pump 16 in the drawing operation, the exhaust opening/closing valve V2 and the return opening/closing valve V5 are opened, and the other opening/closing valves are closed. In this state, a delivery operation is performed, only the photoresist solution the amount of which is obtained by subtracting the expected amount of photoresist solution to be delivered from the amount of photoresist solution drawn by the pump 16 is introduced to the photoresist solution storage chamber 8 through the return path 19. Thereafter, the delivery-side opening/closing valve V4 is opened, and the inflow-side opening/closing valve V1, the drawing-side opening closing valve V3, the return opening/closing valve V5, and the exhaust opening/closing valve V2 are closed. In this state, the delivery operation of the pump 16 is performed, the expected amount of photoresist solution to be delivered is delivered from the delivery nozzle 18, so that the photoresist solution may be injected into the photoresist solution storage chamber 8 without disturbing the chemical liquid delivery/supply operation.

These injection steps may be performed while the chemical liquid delivery/supply -operation is interrupted.

In this embodiment, the photoresist solution in the solution tank 3 is injected into the solution storage chamber 8 by the operation of the pump 16. However, the present invention is not limited to this configuration, so that the injection may be performed by pressuring the solution surface in the solution tank 3. In this case, the solution surface in the solution tank 3 is pressured by a nitrogen gas while the inflow-side opening/closing valve V1 and the exhaust opening/closing valve V2 are opened to introduced the photoresist solution into the solution storage chamber 8. AT the same time, the gas in the solution storage chamber 8 is exhausted from the exhaust path 13 as an exhausting step. By a method similar to the above method, when the solution tank 13 is not empty and, gases contained in the photoresist solution are aggregated and stored in the solution storage chamber 8 or when air bubbles corrected by the filter 11 are aggregated, these gases can be exhausted.

When a filling step of filling a photoresist solution in the solution tank 3 is not performed, and the chemical liquid delivery/supply operation is continuously performed to continuously lower the solution surface, the lowering the solution surface is detected by the sensor 21. As an alarm output step, an alarm representing that the solution surface in the solution storage chamber 8 is at the lowest level is output, and, at the same time, the chemical liquid supply system is stopped.

In the embodiment described above, the sensor 20 arranged in the filter unit 4 is used as a detection step used in the empty detection step however, this is not limited. A sensor 34 serving as a solution detection means indicated by a broken line in FIG. 2 is arranged on the solution guide path 2, and it may be detected that the solution tank 3 is empty such that the sensor 34 detects the solution. Not only the configuration the sensor 34 is integrally formed in the chemical liquid supply system body 1, but also a configuration in which the sensor 34 is located at an arbitrary position on the solution guide path 2 may be employed. For example, the sensor 34 may be integrally arranged together with the solution tank 3 in the joint portion between the solution tank 3 and the solution guide path 2.

Figure 5:
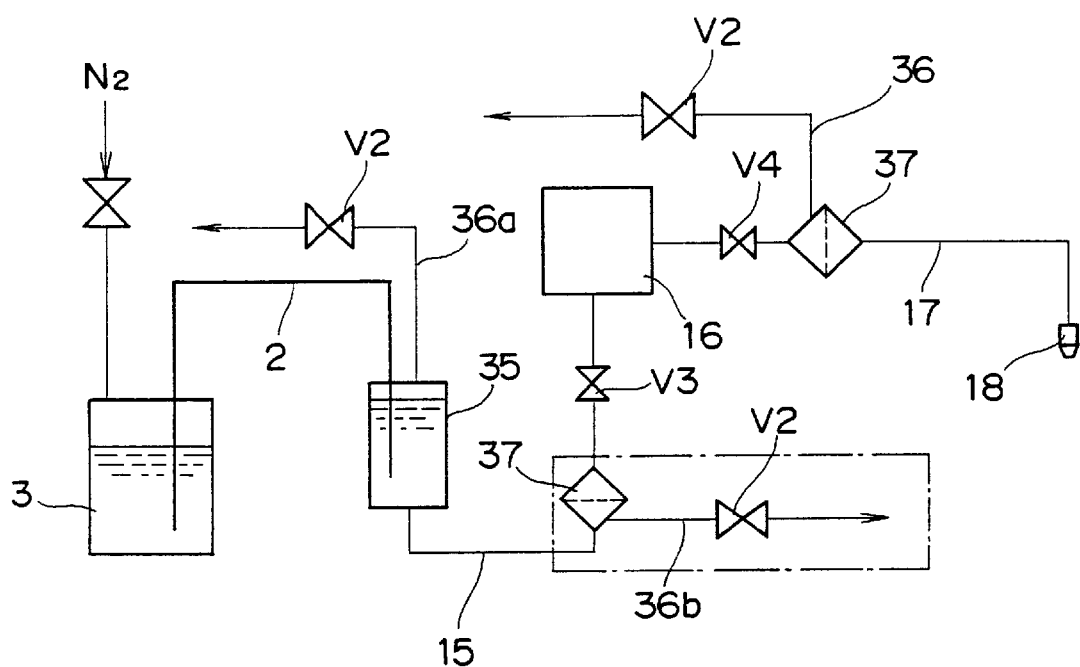
FIG. 5 is a solution circuit diagram showing an outline of a flow of a solution of a chemical liquid supply system as a comparative example.

FIG. 5 is a solution circuit diagram showing an outline of a flow of a solution of a chemical liquid supply system as a comparative example. In FIG. 5, a buffer tank is arranged on the primary side of a pump.

In the chemical liquid supply system shown in FIG. 5, a buffer tank 35 is arranged between the pump 16 and the solution tank 3, so that the pump 16 draws a solution stored in the buffer tank 35 from the bottom of the buffer tank 35 when the solution tanks 3 are exchanged. Therefore, since a gas drawn from the solution guide path 2 when the solution tank 3 is empty is collected on the upper portion of the buffer tank 35, air can be prevented from being drawn by the pump 16. When the photoresist solution is put in the solution tank 3 to fill the solution in the solution tank 3, a nitrogen gas is introduced into the solution tank 3 to supply the photoresist solution to the buffer tank 35, so that the gas collected on the upper portion of the buffer tank 35 is exhausted from an exhaust path 36a.

However, the buffer tank 35 is arranged independently of a filter 37 arranged on the secondary side of the pump 16 shown in FIG. 5 or on the primary side of the pump 16 surrounded by a chain line in FIG. 5. Since exhaust paths 36a and 36b for deflation are arranged for the buffer tank 35 and the filter 37, respectively, the flow path configuration is complicated, and a large number of contact solution surfaces formed. Therefore, it is difficult to increase the degree of purity of the photoresist solution. In addition, since the inner wall of the buffer tank 35 is exposed to air each time the solution tank 3 is empty, the photoresist solution adhered to and remaining on the inner wall is hardened or gelled to be contaminants, and the contaminants are mixed with a solution which is newly supplied. However, since the buffer tank 35 is structured such that the buffer tank 35 cannot be easily exchanged because of the function of the buffer tank 35, it is difficult to remove the deteriorated photoresist solution generated from the inner surface of the buffer tank 35.

In contrast to this, in the chemical liquid supply system according to the present invention, since the solution storage chamber 8 having the buffer function and the filter material housing chamber 9 housing the filter 11 are integrally formed, the number of contact solution surfaces can be decreased by simplifying the flow paths of the chemical liquid supply system, and the degree of purity of the photoresist can be increased. In addition, since the solution storage chamber 8 and the filter unit 4 must be periodically exchanged, gelled contaminants such as a photoresist solution are not accumulated in the solution storage chamber 8. For this reason, the degree of purity of the photoresist solution can be increased.

Figure 6:
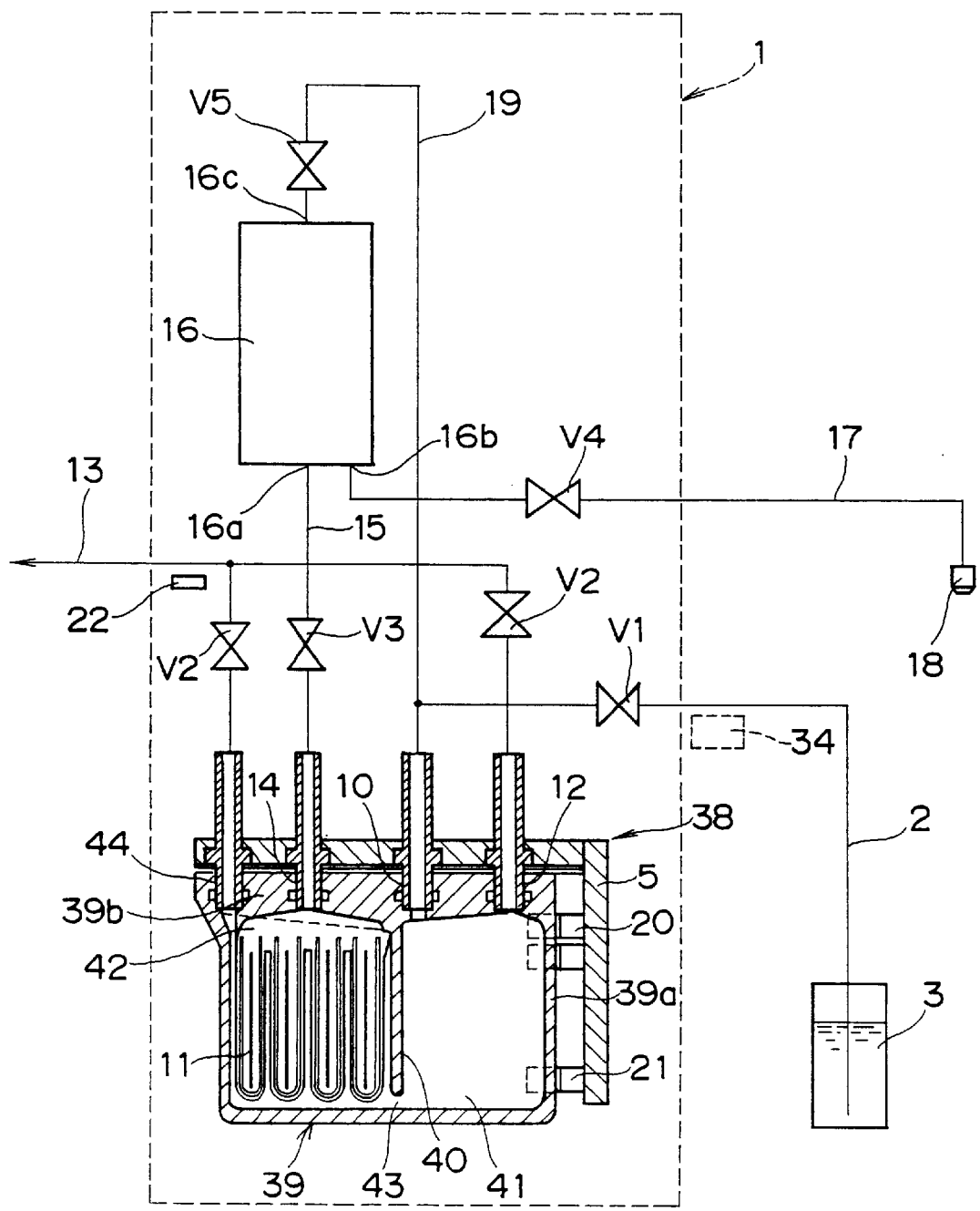
FIG. 6 is a sectional view showing a modification of the chemical liquid supply system shown in FIG. 2 when a solution storage chamber and a filter material housing chamber are arranged in parallel to each other.

FIG. 6 shows a modification of the chemical liquid supply system shown in FIG. 1, and is a schematic diagram showing a case in which a solution storage chamber and a filter material housing chamber are arranged in parallel to each other.

The chemical liquid supply system shown in FIG. 6 has a basic part having the same structure as that shown in FIG. 1. However, a solution storage chamber 41 and a filter material housing chamber 42 are formed in the filter vessel 39 of the filter 38 such that the solution storage chamber 41 and the filter material housing chamber 42 are parallel partitioned by a partition wall 40.

The solution storage chamber 41 and the filter material housing chamber 42 communicate with each other by a communication path 43 formed in the lower end portion of the partition wall 40. A photoresist solution supplied from the solution tank 3 into the solution storage chamber 41 is supplied to the filter material housing chamber 42 through the communication hole 43, filtered by a filter 11, and drawn by a pump 16.

As in the same case as that shown in FIG. 2, a sensor 20 arranged at a position where the solution surface of a photoresist solution supplied into the solution storage chamber 41 is at the highest level, and a sensor 21 is arranged at a position where the solution surface of the photoresist solution supplied into the solution storage chamber 41 is at the lowest level. In place of these sensors 20 and 21, a sensor 34 indicated by a broken line in FIG. 6 may be arranged on the solution guide path 2.

Since the communication hole 43 is formed at a position which is lower than the position of the sensor 21, even though the solution tank 3 is empty to lower the solution surface of the solution storage chamber 41 at the lowest level, the filter 11 is not exposed from the solution.

In the filter 38 in which the solution storage chamber 41 and the filter material housing chamber 42 are arranged in parallel to each other, a gas mixed into the filter material housing chamber 42 cannot be exhausted from an exhaust port 12 communicating with the solution storage chamber 41. For this reason, an exhaust port 44 communicates the filter material housing chamber 42 is formed in the upper-wall portion 39b of the filter vessel 39 of the filter 38 independently of the exhaust port 12 communicating with the solution storage chamber 41, and a gas mixed in the filter material housing chamber 42 can be exhausted from the exhaust port 44.

Figure 7:
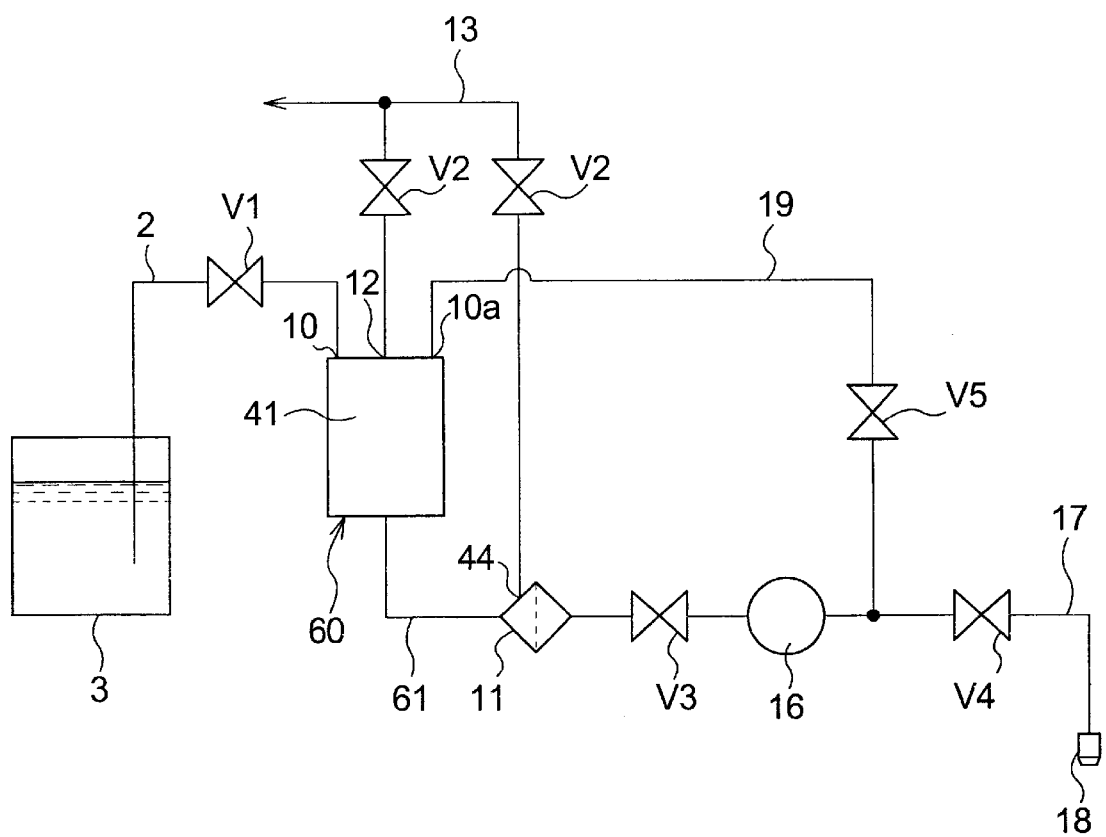
FIG. 7 is a solution circuit diagram showing a modification of the chemical liquid supply system shown in FIG. 6.

FIG. 7 is a solution circuit diagram showing a modification of the chemical liquid supply system shown in FIG. 6. In FIG. 7, same numerals are used for the components corresponding to those as described before.

A solution storage chamber 41 is provided in a buffer tank portion 60, on which two solution inflow ports 10 and 10a are formed. The solution inflow port 10 is connected to a solution guide path 2, and the solution inflow port 10a is with a returning path 19. An outlet of the buffer tank portion 60 communicates with an inlet of the filter 11 through a communication path 61, and an exhaust path 13 is connected to the filter 11 so as to exhaust gasses in the filter 11. As the communication path 61, it may be formed as the communication path 43 defined by a partition wall 40 as shown in FIG. 6 or any pipes may be used therefor.

Figure 8:
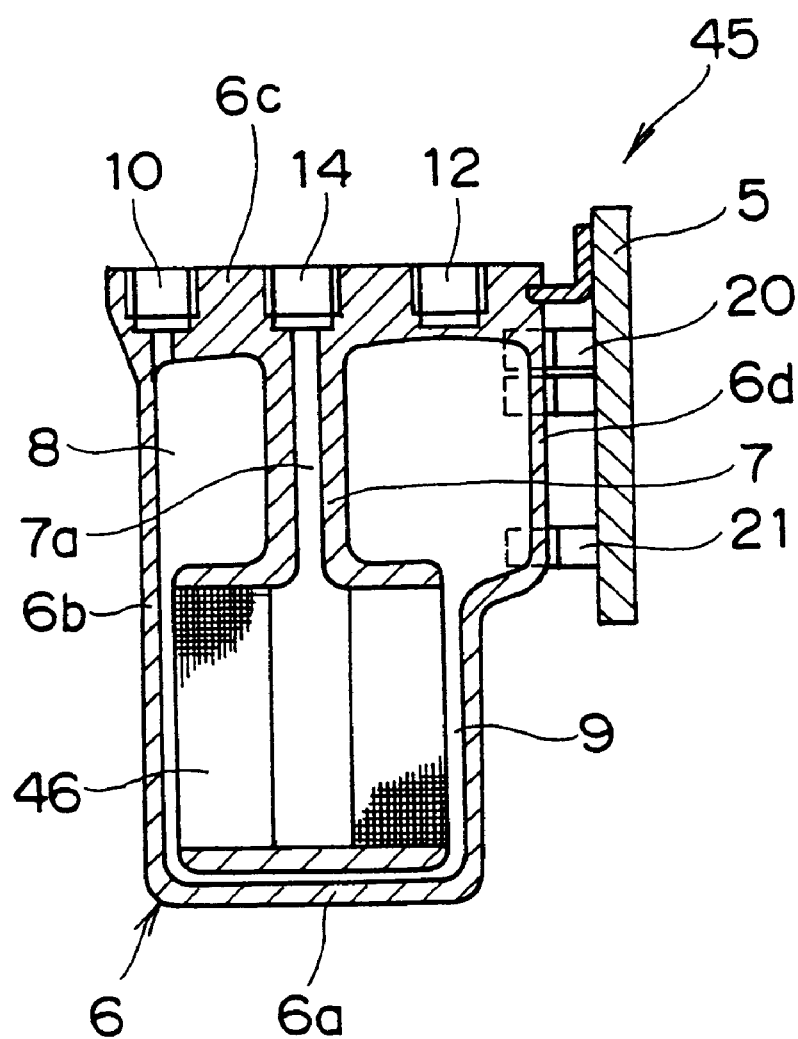
FIG. 8 is a sectional view showing a modification of the filter unit shown in FIG. 2.

FIG. 8 is a sectional view showing a modification of the filter shown in FIG. 2.

In the filter unit 4 shown in FIG. 2, the solution guide path 2, the exhaust path 13, and the pump inlet-side path 15 respectively connected to the solution inflow port 10, the exhaust port 12, and the solution outflow port 14 are fixed by the blanket 5. However, in the filter unit 45, a solution guide path 2, an exhaust path 13, and a pump inlet-side path 15 are connected by tapered screws formed in a solution inflow port 10, an exhaust port 12, and a solution outflow port 14, respectively. In this manner, the solution guide path 2, the exhaust path 13, and the pump inlet-side path 15 are connected by the tapered screws, so that the solution can be prevented from leaking from the connection portion.

Joint pipes are attached to these ports 10, 12, and 14. The filter unit 4 may be connected to the solution tank 3 or the pump 16 by a pipe, and the filter unit 4 may be arranged independently of the chemical liquid supply system body 1.

In a filter material housing chamber 9 of the filter unit 45, a filter unit 46 formed of a sheet-like film is used. As the filter, not only a filter formed of hollow-fiber membranes used as the filter unit 4 shown in FIG. 2 or a filter formed of a sheet-like film used as the filter unit 45 shown in FIG. 7, but also any filter which can filter a chemical liquid can be used.

Figure 9:
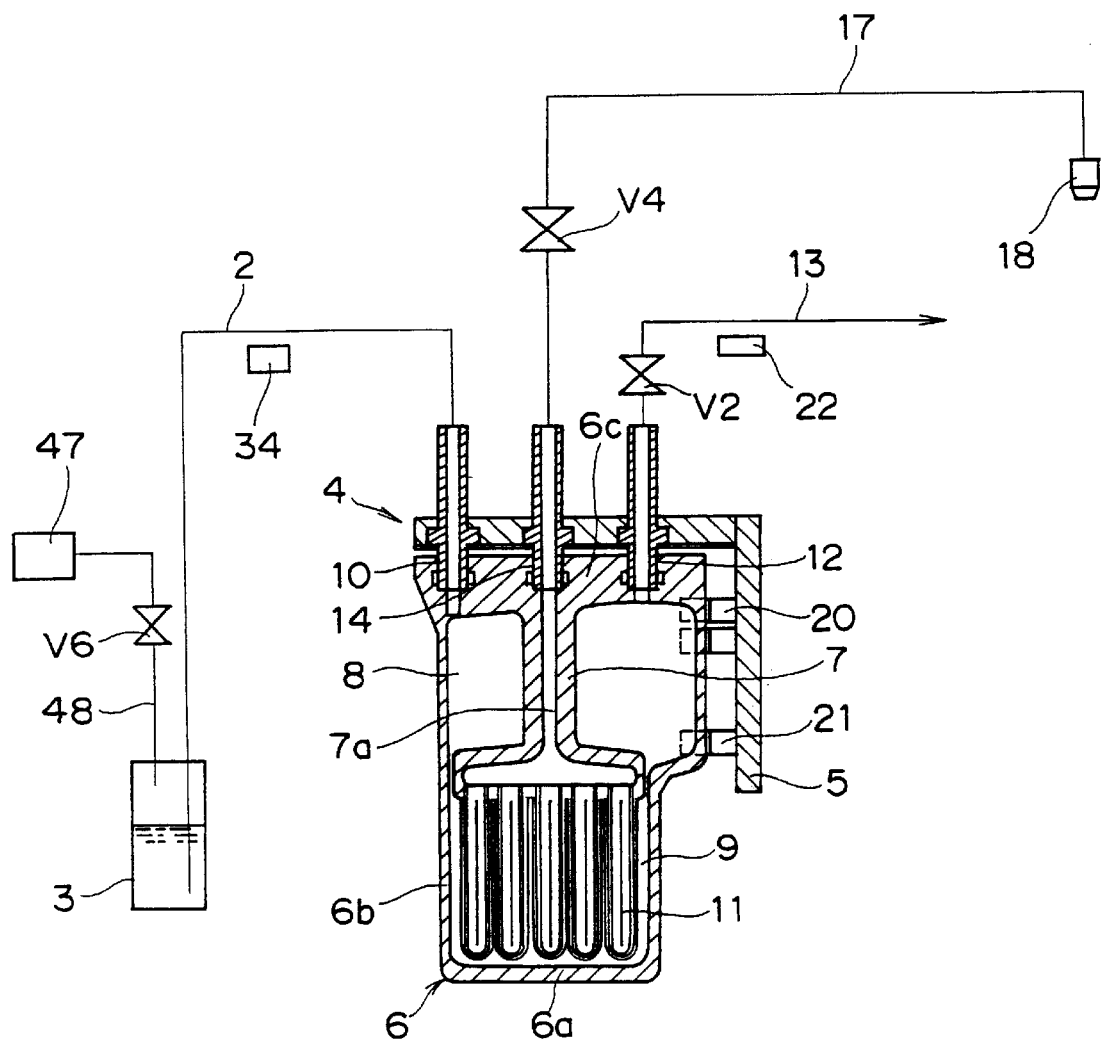
FIG. 9 is a sectional view showing the details of a chemical liquid supply system according to another embodiment of the present invention.

FIG. 9 is a sectional view showing the details of a chemical liquid supply system according to another embodiment of the present invention, and shows a case in which a pressure-sending means is used in place of a pump.

The filter unit 4 used in the chemical liquid supply system shown in FIG. 9 has the same structure as that shown in FIG. 2, and has the same function as that shown in FIG. 2.

A nitrogen gas supply unit 47 serving as a pressure-sending means is connected to a solution tank 3 of the chemical liquid supply system through a flow path 48 on which an opening/closing valve V6 is arranged. When the opening/closing valve V6 is opened, a nitrogen gas is supplied into the solution tank 3 to pressure the solution surface of a chemical liquid. In this embodiment, although the nitrogen gas supply unit 47 is used as the pressure-sending means, the pressure-sending means is not limited to the nitrogen gas supply unit 47, and another gas may be supplied.

An inflow-side opening/closing valve V1 is not arranged on a solution guide path 2, and a solution delivery path 17 on which a delivery-side opening/closing valve V4 is arranged is connected to a solution outflow port 14 arranged in a filter vessel 6 of a filter unit 4. The other configuration has the same structure as that of the chemical liquid supply system shown in FIG. 2.

With the structure, the opening/closing valve V6 is opened, and the solution surface in the solution tank 3 is pressured. In this state, when the delivery-side opening/closing valve V4 is opened at a predetermined timing, the chemical liquid in the solution tank 3 can be delivered from a delivery nozzle 18 through the filter unit 4.

The present invention is not limited to the above embodiments, and various changes of the present invention can be effected without departing from the spirit and scope of the invention, as a matter of course. For example, in this embodiment, though the pump 9 is the one having a flexible tube as disclosed in Japanese Patent Laid-Open Publication No. 11-230048, it is not limited thereto. Namely, any pump such as a bellows pump as described in Japanese Patent Laid-Open Publication No. 10-61558 may be used.

According to the present invention, the solution storage chamber and the filter material housing chamber for housing a filter are integrally formed, the number of contact solution surfaces is decreased by simplifying the flow paths of the chemical liquid supply system, and a chemical liquid having a high degree of purity can be coated.

In the conventional chemical liquid supply system, the exhaust paths are arranged in the buffer tank and the filter, respectively. However, in the chemical liquid supply system according to the present invention, a configuration using only one exhaust path can be achieved. For this reason, the number of contact solution surfaces is decreased by simplifying the configuration of the chemical liquid supply system, and a chemical liquid having a high degree of purity can be coated.

In addition, since the filter is attachably/detachably arranged, the chemical liquid supply system can be easily maintained.

Furthermore, filters are periodically exchanged. However, since solution storage chambers are exchanged in this case, contamination caused by a chemical liquid which is adhered to the inner wall of the solution storage chamber, hardened, and gelled can be suppressed to the minimum level, and the degree of purity of the chemical liquid can be increased.

What is claimed is:

1. A filter unit comprising:
   a filter vessel in which a filter material housing chamber and a solution storage chamber for storing a chemical liquid are arranged, said filter material housing chamber having a bottom wall portion, a side wall portion, and an upper wall portion and having a filter material incorporated therein;
   a solution inflow port arranged on the filter vessel to communicate with the solution storage chamber;
   a solution outflow port, arranged on the filter vessel, for guiding a solution filtered by the filter material;
   an exhaust port, arranged on the filter vessel to communicate with the solution storage chamber, for exhausting a gas in the solution storage chamber; and
   solution level detection means for detecting a solution level of the chemical liquid in the solution storage chamber.

2. A filter unit according to claim 1, wherein the filter vessel supports the filter material and has an adaptor for partitioning the filter vessel into a lower filter material housing chamber and an upper solution storage chamber, and the adaptor has a filtered solution guide path for guiding a filtered chemical liquid to the solution outflow port.

3. A filter unit according to claim 1, wherein the filter vessel has a partition wall for partitioning the filter vessel into the solution storage chamber and the filter material housing chamber, and a communication hole for causing the solution storage chamber and the filter material housing chamber to communicate with each other is formed in a lower end portion of the partition wall.

4. A filter unit according to claim 3, further comprising an exhaust port arranged on the filter vessel to communicate with the filter material housing chamber.

5. A chemical liquid supply system comprising:
   a pump and a solution inflow port, said pump having a solution delivery port to which a solution delivery path having a delivery nozzle arranged thereon is connected;
   a filter vessel in which a filter housing chamber having a filter material incorporated therein and a solution storage chamber for storing a chemical liquid are arranged;
   a solution inflow port to which a solution guide path connected to a solution tank is connected and which is formed on the filter vessel to communicate with the solution storage chamber;
   a solution outflow port which is formed on the filter vessel and to which a pump inlet path connected to the solution inflow port is connected; and
   an exhaust port, which is formed on the filter vessel to communicate the solution storage chamber, for exhausting a gas in the solution storage chamber.

6. A chemical liquid supply system according to claim 5, wherein the filter vessel is integrated with the pump.

7. A chemical liquid supply system according to claim 6, wherein a return path for connecting the pump to the solution storage chamber, and the chemical liquid and the gas in the pump can be moved to the solution storage chamber.

8. A chemical liquid supply system according to claim 5, wherein a return path for connecting the pump to the solution storage chamber, and the chemical liquid and the gas in the pump can be moved to the solution storage chamber.

9. A chemical liquid supply system according to claim 5, wherein the filter vessel is detachable.

10. A chemical liquid supply system according to claim 5, further comprising solution level detection means for detecting a solution level of the chemical liquid in the solution storage chamber.

11. A chemical liquid supply system according to claim 5, further comprising solution detection means for detecting whether or not a solution is present in the solution guide path.

12. A chemical liquid supply system according to claim 5, further comprising solution detection means for detecting whether or not a solution is present in the exhaust path connected to the exhaust port.

13. A chemical liquid supply system comprising:
   a filter vessel in which a filter material housing chamber having a filter material incorporated therein, and a solution storage chamber for storing a chemical liquid are arranged;
   a solution inflow port to which a solution guide path connected to a solution tank is connected and which is formed on the filter vessel to communicate with the solution storage chamber;
   a solution outflow port which is formed on the filter vessel and to which a solution delivery path provided with the delivery nozzle is connected;
   an exhaust port, which is formed on the filter vessel to communicate the solution storage chamber, for exhausting a gas in the solution storage chamber; and
   pressure-sending means for pressure-sending the chemical liquid in the solution storage chamber to the delivery nozzle by pressuring the solution surface of the solution tank.

14. A chemical liquid supply system according to claim 13, wherein the filter vessel is detachable.

15. A chemical liquid supply system according to claim 13, further comprising solution level detection means for detecting a solution level of the chemical liquid in the solution storage chamber.

16. A chemical liquid supply system according to claim 13, further comprising solution detection means for detecting whether or not a solution is present in the solution guide path.

17. A chemical liquid supply system according to claim 13, further comprising solution detection means for detecting whether or not a solution is present in the exhaust path connected to the exhaust port.

18. A chemical liquid supply system comprising:
   a buffer tank portion having a solution storage chamber communicated through a solution guide path with a solution tank which stores a chemical liquid therein;
   a filter having a filter inlet and a filter outlet, said filter inlet communicating with an outlet of the buffer tank portion;
   a pump having a pump inlet and a pump outlet, said pump inlet communicating with the filter outlet and said pump outlet communicating with a delivery nozzle through a solution delivery path;
   a returning path provided between the pump outlet and the buffer tank portion to connect with each other, said returning path returning the chemical liquid delivered from the pump to the solution storage chamber; and
   an exhaust port, which is provided to connect with the buffer tank portion, for exhausting air in the solution storage chamber.

19. A chemical liquid supply system according to claim 18, further comprising an exhaust path, which is provided to connected with the filter, for exhausting gasses in the filter.

20. A chemical liquid supply method using a chemical liquid supply system including a pump having a solution delivery port to which a solution delivery path having a delivery nozzle arranged thereon is connected and a solution inflow port; a filter vessel in which a filter housing chamber having a filter material incorporated therein and a solution storage chamber for storing a chemical liquid are arranged; a solution tank connected to the solution storage chamber through a solution guide path; and solution level detection means for detecting a solution level of the chemical liquid in the solution storage chamber, comprising:
   the empty detection step of detecting that the solution tank is empty when the solution level detection means detects that the solution level of the chemical liquid in the solution storage chamber is not higher than a predetermined value;
   the filling step of setting the solution tank in an initial state; and
   the injection step of injecting the chemical liquid in the solution tank into the solution storage chamber such that the solution level is not lower than the predetermined value, wherein the chemical liquid is injected into the solution storage chamber while a chemical liquid delivery/supply operation from the delivery nozzle is performed by operating the pump.

21. A chemical liquid supply method according to claim 20, further comprising the exhaust step of exhausting a gas storage chamber in the injection step from an exhaust path.

22. A chemical liquid supply method according to claim 20, further comprising the alarm output step of outputting an alarm when lowest solution level detection means detects that the solution level in the solution storage chamber is the lowest solution level.

23. A chemical liquid supply method using a chemical liquid supply system including a filter vessel in which a filter material housing chamber having a filter material incorporated therein and a solution storage chamber for storing a chemical liquid are arranged; a solution tank connected to the solution storage chamber through a solution guide path; pressure-sending means for pressure-sending the chemical liquid in the solution storage chamber to the delivery nozzle by pressuring the solution surface of the solution tank; and solution level detection means for detecting a solution level of the chemical liquid in the solution storage chamber, comprising:
   the empty detection step of detecting that the chemical liquid in the solution tank is exhausted when the solution detection means detects that the solution is not present in the solution guide path;
   the filling step of setting the solution tank in an initial state; and
   the injection step of injecting the chemical liquid in the solution tank into the solution storage chamber such that the solution level of the chemical liquid in the solution storage chamber detected by the solution level detection means is not lower than the predetermined value, wherein the chemical liquid is injected into the solution storage chamber while a chemical liquid delivery/supply operation from the delivery nozzle is performed by the pressure sending means.

24. A chemical liquid supply method according to claim 23, further comprising the exhaust step of exhausting a gas storage chamber in the injection step from an exhaust path.

25. A chemical liquid supply method according to claim 23, further comprising the alarm output step of outputting an alarm when lowest solution level detection means detects that the solution level in the solution storage chamber is the lowest solution level.

26. A chemical liquid supply method using a chemical liquid supply system including a pump having a solution delivery port to which a solution delivery path having a delivery nozzle arranged thereon is connected and a solution inflow port; a filter vessel in which a filter material having a filter material incorporated therein storage chamber for storing a chemical liquid are arranged; a solution tank connected to the solution storage chamber through a solution guide path; solution level detection means for detecting a solution level of the chemical liquid in the solution storage chamber; and solution detection means for detecting the solution in the solution guide path, comprising:

the empty detection step of detecting that the chemical 15 liquid in the solution tank is exhausted when the solution detection means detects that the solution is not present in the solution guide path;

the filling step of setting the solution tank in an initial state; and the injection step of injecting the chemical liquid in the solution tank into the solution storage chamber such that the solution level of the chemical liquid in the solution storage chamber detected by the solution level detection means is not lower than the predetermined value, wherein the chemical liquid is injected into the solution storage chamber while a chemical delivery/supply operation from the delivery nozzle is performed by operating the pump.

27. A chemical liquid supply method according to claim 26, further comprising the exhaust step of exhausting a gas storage chamber in the injection step from an exhaust path.

28. A chemical liquid supply method according to claim 26, further comprising the alarm output step of outputting an alarm when lowest solution level detection means detects that the solution level in the solution storage chamber is the lowest solution level.

29. A chemical liquid supply method using a chemical liquid supply system including a filter vessel in which a filter material housing chamber having a filter material incorporated therein and a solution storage chamber for storing a chemical liquid are arranged; a solution tank connected to the solution storage chamber through a solution guide path; pressure-sending means for pressure-sending the chemical liquid in the solution storage chamber to the delivery nozzle by pressuring the solution surface of the solution tank; and solution detection means for detecting a solution in the solution guide path, comprising:

the empty detection step of detecting that the chemical liquid in the solution tank is exhausted when the solution detection means detects that the solution is not present in the solution guide path;

the filling step of setting the solution tank in an initial state; and the injection step of injecting the chemical liquid in the solution tank into the solution storage chamber such that the solution level of the chemical liquid in the solution storage chamber detected by the solution level detection means is not lower than the predetermined value, wherein the chemical liquid is injected into the solution storage chamber while a chemical liquid delivery/supply operation from the delivery nozzle is performed by the pressure-sending means.

30. A chemical liquid supply method according to claim 29, further comprising the exhaust step of exhausting a gas storage chamber in the injection step from an exhaust path.

31. A chemical liquid supply method according to claim 29, further comprising the alarm output step of outputting an alarm when lowest solution level detection means detects that the solution level in the solution storage chamber is the lowest solution level.

* * * * *